United States Patent [19]

Finlayson et al.

[11] 4,302,146
[45] Nov. 24, 1981

[54] PROBE POSITIONER

[75] Inventors: James W. Finlayson, Belle Vernon; Renato D. Reyes, Monroeville; Ralph F. Eberle, Leechburg; Thaddeus A. Wojcik, Greensburg; James L. Gumbert, McKeesport; Robert B. McKeever, Greensburg; Emery E. Nagy, Pricedale; Howard E. Houserman, Jr., Pittsburgh, all of Pa.

[73] Assignee: Westinghouse Electric Corp., Pittsburgh, Pa.

[21] Appl. No.: 936,297

[22] Filed: Aug. 23, 1978

[51] Int. Cl.³ .............................................. B25J 5/00
[52] U.S. Cl. .................................... 414/744 R; 165/76
[58] Field of Search ........... 414/744 R, 744 A, 744 B, 414/744 C; 165/76; 403/325, 379; 180/53 FE, 53 D, 53 R

[56] References Cited

U.S. PATENT DOCUMENTS

| | | | |
|---|---|---|---|
| 3,138,393 | 6/1964 | Livingston | 403/325 X |
| 3,610,438 | 10/1971 | Opdahl | 414/738 |
| 3,673,950 | 7/1972 | Koehler et al. | 414/744 A |
| 3,841,672 | 10/1974 | Schultz et al. | 403/379 X |
| 4,074,814 | 2/1978 | Cooper et al. | 165/76 X |

OTHER PUBLICATIONS

Steam Generator Update, Jul. 1976, Westinghouse Electric Corp., Nuclear Energy Systems.

Primary Examiner—Stephen G. Kunin
Assistant Examiner—Terrance L. Siemens
Attorney, Agent, or Firm—L. A. DePaul

[57] ABSTRACT

A probe positioner capable of being supported from a tube sheet of a nuclear steam generator for positioning a probe in relationship to the tube sheet of the nuclear steam generator comprises a locking mechanism for locking the probe positioner in the tube sheet and a plurality of rotatable arms for positioning the probe. The probe positioner also comprises quick disconnect motors for rotating the arms of the probe positioner relative to each other.

10 Claims, 14 Drawing Figures

PROBE POSITIONER

CROSS-REFERENCES TO RELATED APPLICATIONS

The invention described herein is related to copending application Ser. No. 888,701, filed Mar. 21, 1978, entitled "Apparatus for Remotely Repairing Tubes in a Steam Generator" by L. R. Golick which is assigned to the assignee of the present application.

BACKGROUND OF THE INVENTION

This invention relates to probe positioners and more particularly to remotely controlled probe positioners for inspecting nuclear steam generators.

There are many situations in which a hazardous environment limits human access to various locations. One such situation occurs in the inspection and repair of nuclear steam generators. A typical nuclear steam generator comprises a vertically oriented shell, a plurality of U-shaped tubes disposed in the shell so as to form a tube bundle, a tube sheet for supporting the tubes at the ends opposite the U-like curvature, and a dividing plate that cooperates with the tube sheet forming a primary fluid inlet plenum at the one end of the tube bundle and a primary fluid outlet plenum at the other end of the tube bundle. The primary fluid having been heated by circulation through the nuclear reactor core enters the steam generator through the primary fluid inlet plenum. From the primary fluid inlet plenum, the primary fluid flows upwardly through first openings in the U-tubes near the tube sheet which supports the tubes, through the U-tube curvature, downwardly through second openings in the U-tubes near the tube sheet, and into the primary fluid outlet plenum. At the same time, a secondary fluid, known as feedwater, is circulated around the U-tubes in heat transfer relationship therewith thereby transferring heat from the primary fluid in the tubes to the secondary fluid surrounding the tubes causing a portion of the secondary fluid to be converted to steam. Since the primary fluid contains radioactive particles and is isolated from the secondary fluid by the U-tube walls and the tube sheet, it is important that the U-tubes and a tube sheet be maintained defect-free so that no breaks will occur in the U-tubes or in the welds between the U-tubes and the tube sheet thus preventing contamination of the secondary fluid by the primary fluid.

Occasionally, it is necessary to either inspect or repair the U-tubes or tube sheet welds by way of access through the primary fluid inlet and outlet plenum. For this purpose, manways are provided in the vertical shell so that working personnel may enter the inlet and outlet plenum to perform operations on the U-tubes and the tube sheet. However, since the primary fluid which is generally water contains radioactive particles, the inlet and outlet plenum become radioactive which thereby limits the time that working personnel may be present therein. Accordingly, it would be advantageous to be able to perform operations on the U-tubes and the tube-sheet without requiring the presence of working personnel. There are several mechanisms known in the art that attempt to provide a solution to this problem, but none of them have been able to completely solve the problem.

What is needed is a remotely operable probe positioner that is capable of positioning a probe for inspecting the tube sheet or U-tubes in a nuclear steam generator without subjecting working personnel to great radiation hazards.

SUMMARY OF THE INVENTION

A remotely operable probe positioner comprises a support for attaching the probe positioner to the tube sheet in a nuclear steam generator and a plurality of rotatable arms suspended from the support that are capable of being rotated so as to position a probe in alignment with the holes in the tube sheet or U-tubes of a nuclear steam generator. The probe positioner also comprises quick disconnect motors that are capable of being quickly connected to arms of the probe positioner so as to be able to rotate the arms relative to each other thus positioning the probe in relationship to the tube sheet.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

In a tube-type steam generator, a tube sheet supports a bundle of heat transfer tubes. The invention described herein provides a remotely operated probe positioner for positioning inspection equipment near the tube sheet of a nuclear steam generator.

Figure 1:
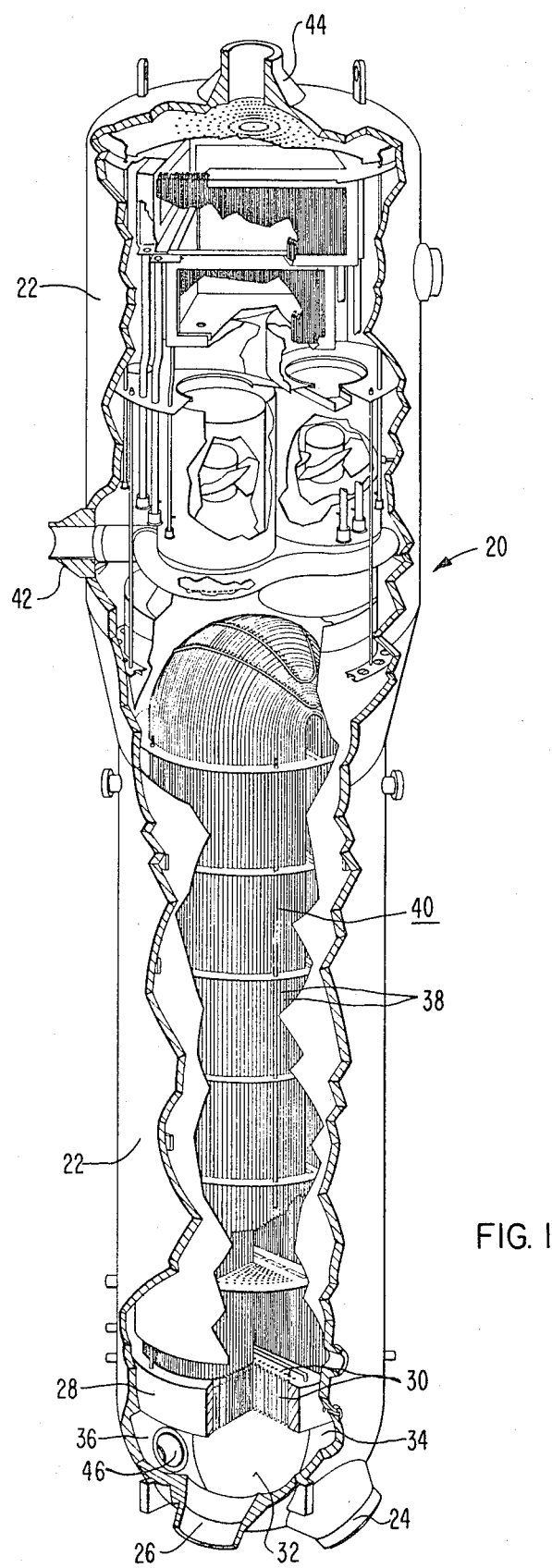
FIG. 1 is a partial cross-sectional view in elevation of a typical steam generator.

Referring to FIG. 1, a nuclear steam generator referred to generally as 20, comprises an outer shell 22 with a primary fluid inlet nozzle 24 and a primary fluid outlet nozzle 26 attached thereto near its lower end. A generally cylindrical tube sheet 28 having tube holes 30 therein is also attached to outer shell 22 near its lower end. A dividing plate 32 attached to both tube sheet 28 and outer shell 22 defines a primary fluid inlet plenum 34 and a primary fluid outlet plenum 36 in the lower end of the steam generator as is well understood in the art. Tubes 38 which are heat transfer tubes shaped with a U-like curvature are disposed within outer shell 22 and are attached to tube sheet 28 by means of tube holes 30. Tubes 38 which may number about 7,000 form a tube bundle 40. In addition, a secondary fluid inlet nozzle 42 is disposed on outer shell 22 for providing a secondary fluid such as water while a steam outlet nozzle 44 is attached to the top of outer shell 22. In operation, the primary fluid which may be water having been heated by circulation through the nuclear core enters steam generator 20 through primary fluid inlet nozzle 24 and flows into primary fluid inlet plenum 34. From primary fluid inlet plenum 34, the primary fluid flows upwardly through the tubes 38 in tube sheet 28, up through the U-shaped curvature of tubes 38, down through tubes 38 and into primary fluid outlet plenum 36 where the primary fluid exits the steam generator through primary fluid outlet nozzle 26. While flowing through tubes 38, heat is transferred from the primary fluid to the secondary fluid which surrounds tubes 38 causing the secondary fluid to vaporize. The resulting steam then exits the steam generator through steam outlet nozzle 44. On occasion, it is necessary to inspect or repair tubes 38 or the welds between tubes 38 and the tube sheet 28 to ensure that the primary fluid which may contain radioactive particles remains isolated from the secondary fluid. Therefore, manways 46 are provided in outer shell 22 to provide access to both primary fluid inlet plenum 34 and primary fluid outlet plenum 36 so that access may be had to the entire tube sheet 28.

Figure 2:
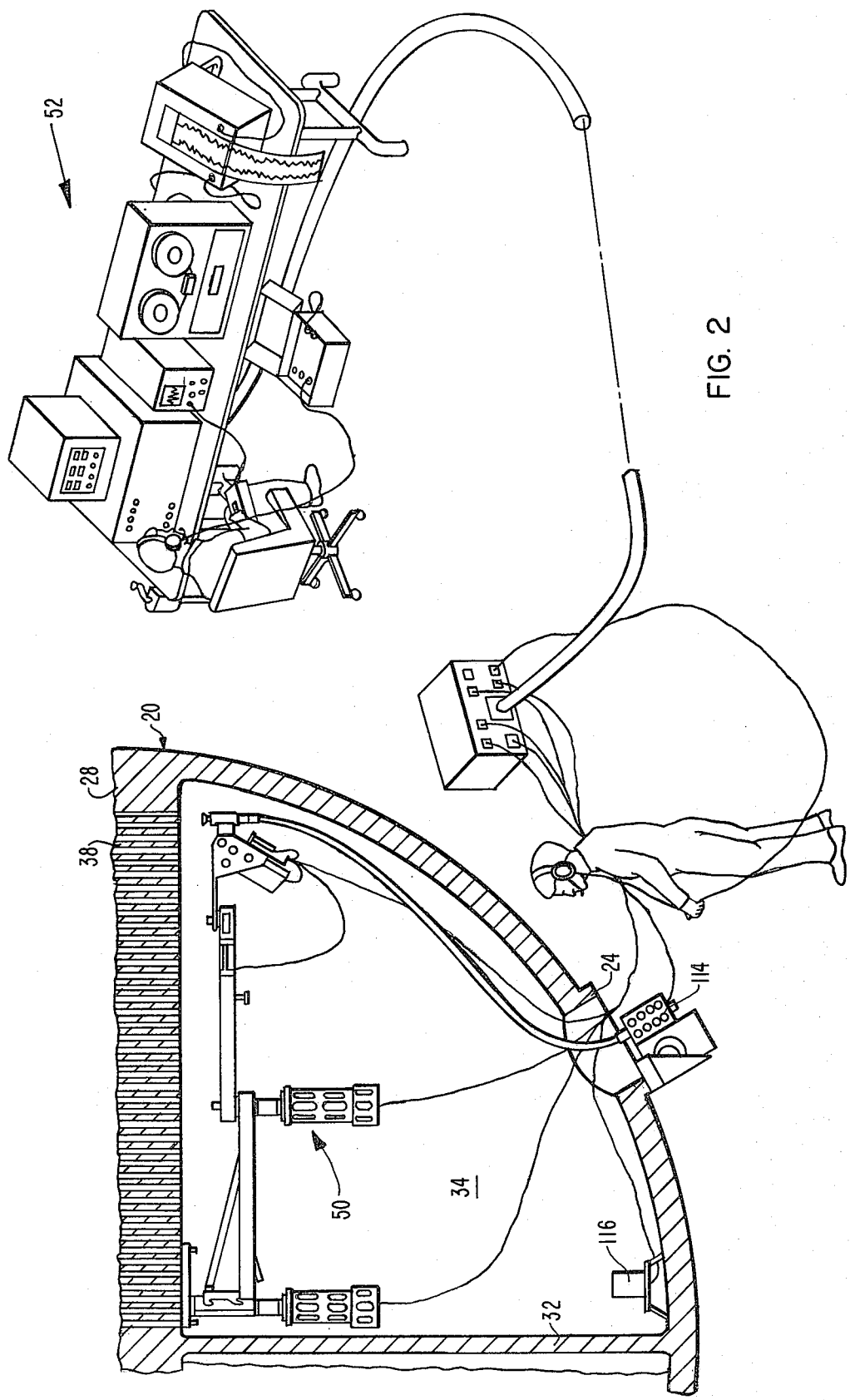
FIG. 2 is a schematic view of the probe positioner and accompanying apparatus disposed in a nuclear steam generator.

Referring now to FIG. 2, the probe positioner is referred to generally as 50 and is capable of being suspended beneath the tube sheet 28 in inlet plenum 34. Probe positioner 50 is connected by way of electrical cables to control panel 52 which may be located remote from the nuclear steam generator 20. Control panel 52 is composed of equipment chosen from those well known in the art so as to be able to remotely control the movements of probe positioner 50.

Figure 3:
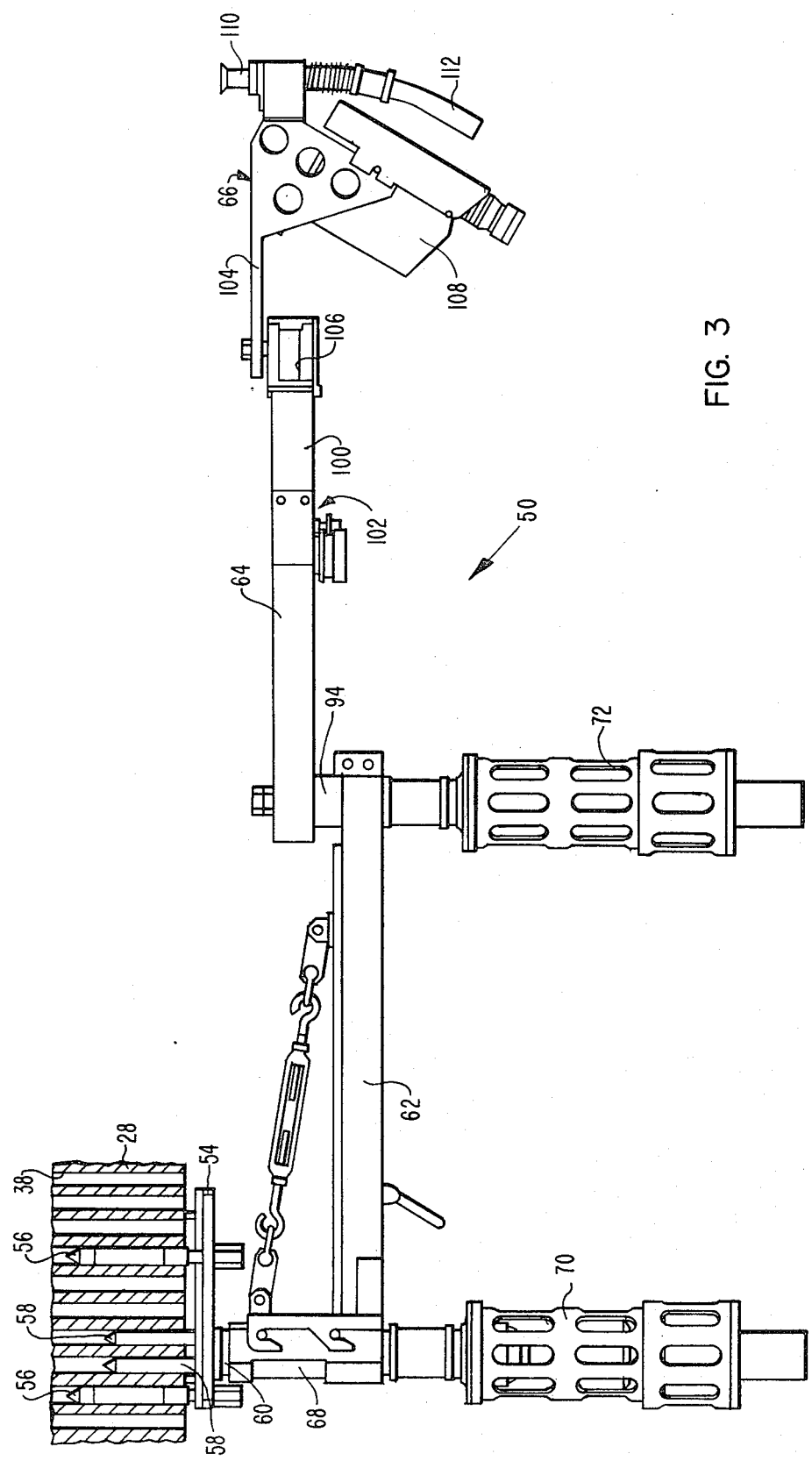
FIG. 3 is a view in elevation of the probe positioner.
Figure 4:
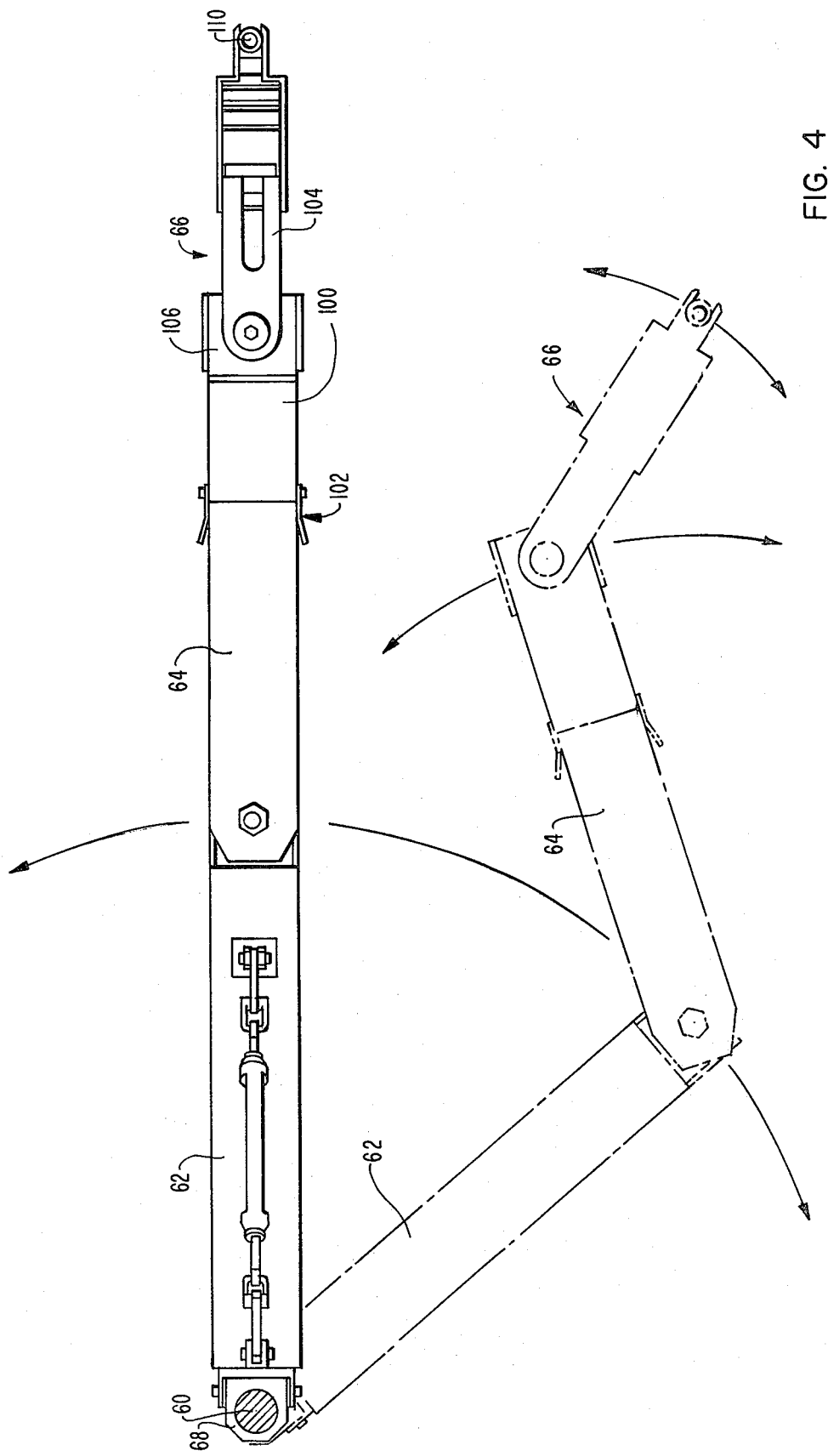
FIG. 4 is a top view of the probe positioner.

Referring now to FIG. 3, probe positioner 50 comprises a support plate 54 with at least two camlocks 56 attached thereto which are capable of being inserted into tubes 38 of tube sheet 28 so as to engage the inner surfaces of tubes 38 thereby suspending support plate 54 therefrom. Support plate 54 also has a plurality of guide pins 58 attached thereto which are also capable of being extended into tubes 38. While guide pins 58 do not suspend support plate 54 from tube sheet 28, guide pins 58 do provide alignment for camlocks 56 and alignment for support plate 54 in relationship to tube sheet 28. Camlocks 56 may be chosen from those well known in the art and can be capable of manual or remote activation so as to be able to engage tubes 38 and suspend support plate 54 from tube sheet 28. Probe positioner 50 also comprises a central member 60 which is permanently attached to support plate 54 so as to suspend the remainer of probe positioner 50 from support plate 54 and tube sheet 28. Probe positioner 50 also comprises a first arm 62, a second arm 64, and a third arm 66. A first sleeve 68 is rotatably disposed on central member 60 so as to be able to be rotated about a vertical axis of central member 60. First arm 62 is connected to first sleeve 68 so that first arm 66 is capable of rotating in a horizontal plane about a vertical axis through central member 60. Second arm 64 is rotatably connected to the end of first arm 62 which is opposite the end of first arm 62 which is attached to first sleeve 68. In addition, third arm 66 is also connected to second arm 64. First arm 62 is capable of rotating in a horizontal plane with respect to central member 60, second arm 64 is capable of rotating in a horizontal plane with respect to first arm 62, and third arm 66 is capable of rotating in a horizontal plane with respect to second arm 64 as shown in FIG. 4. Referring again to FIG. 3, probe positioner 50 also comprises a first drive mechanism 70 which is capable of being attached to the bottom end of first sleeve 68 for rotating first sleeve 68 with respect to central member 60 thus rotating first arm 62 with respect to central member 60. First drive mechanism 70 may be chosen from those well known in the art and may comprise a commercially available stepping motor, a harmonic drive gear reduction box, and a slip clutch. The weight of each such drive unit may be approximately 15 pounds with the electrical connections being carried by electrical conduits to control panel 52 which would be located remote from the steam generator 20. A second drive mechanism 72 is similarly attached to second arm 64 so as to be capable of rotating second arm 64 with respect to first arm 62.

Figure 5:
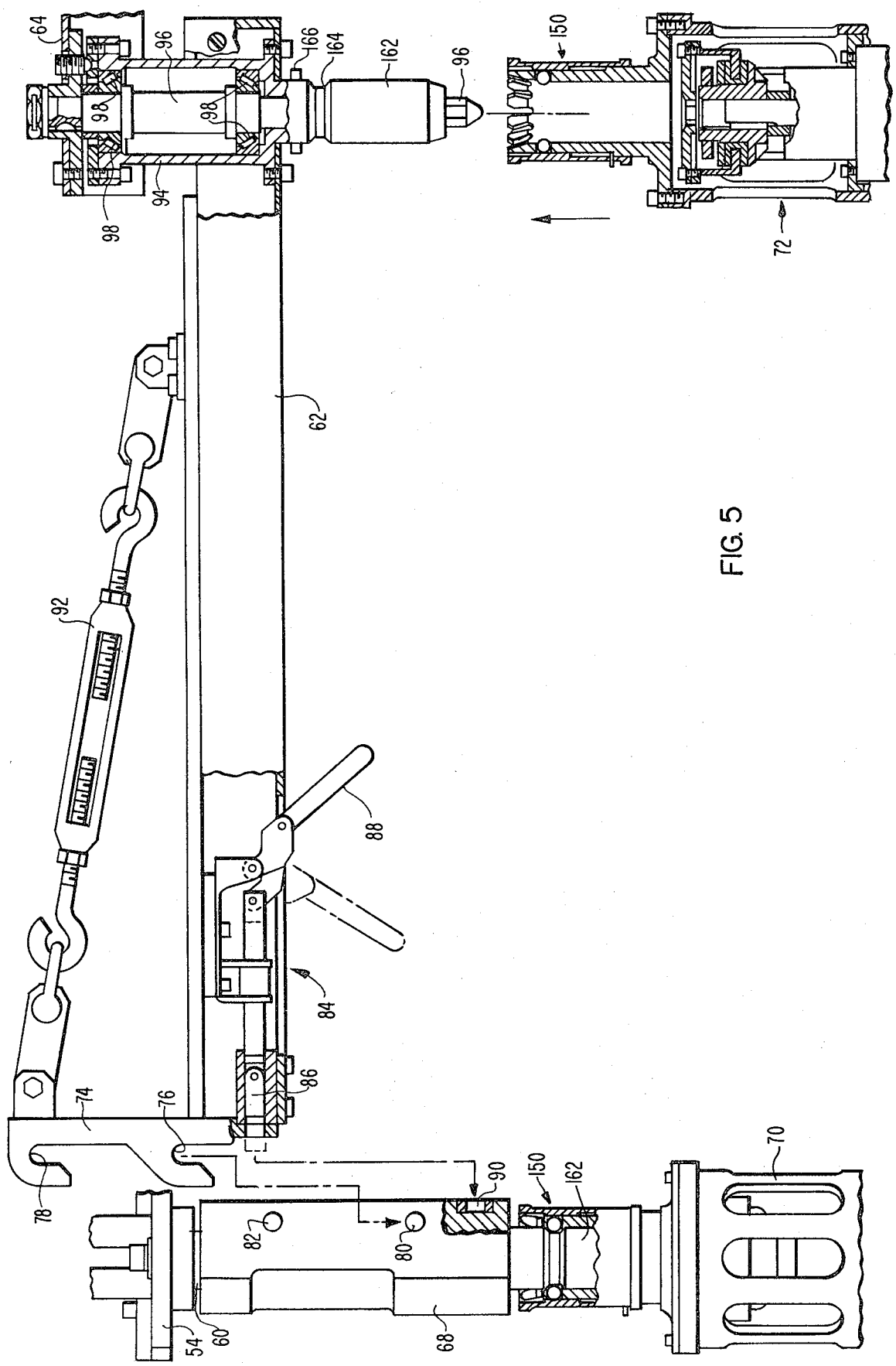
FIG. 5 is a partial cross-sectional view in elevation of the probe positioner showing several of its interconnections.

Referring now to FIG. 5, first arm 62 has a notched member 74 attached to one end thereof that has a first notch 76 and a second notch 78 therein. First sleeve 68 has a first pin 80 and a second pin 82 attached thereto which extends outwardly therefrom. First pin 80 and second pin 82 are capable of supporting the weight of the several arms of probe positioner 50. Once support plate 54 has been positioned beneath tube sheet 28 so that camlocks 56 and guide pins 58 are disposed within tubes 38, first arm 62 may be arranged as shown in FIG. 5 so that first notch 76 may be engaged with first pin 80 while second notch 78 may be engaged with second pin 82 thereby supporting the weight of first arm 62 from first sleeve 68. With first arm 62 attached to first sleeve 68 by means of notched member 74, locking mechanism 84 may be engaged. Locking mechanism 84 comprises a third pin 86 slideably disposed in the end of first arm 62 near notched member 74 and attached to lever 88 so that when first arm 62 has been attached to first sleeve 68 by means of notched member 74, lever 88 may be moved towards first sleeve 68 so as to engage third pin 86 with slot 90 in first sleeve 68 as shown in FIG. 5. First arm 62 also has a support mechanism 92 with one end attached to notched member 74 and with the other end attached to first arm 62 so as to stabilize first arm 62 with respect to notched member 74 and sleeve 68.

Referring now to FIGS. 3 and 5, a first housing 94 is attached to one end of first arm 62 and has a vertical first shaft 96 extending therethrough. First shaft 96 is disposed in first housing 94 by means of two sets of bearings 98 which may be chosen from those well known in the art. Second arm 64 is attached to the top end of first shaft 96 with the bottom end of first shaft 96 being capable of attachment to second drive mechanism 72 such that second drive mechanism 72 may rotate first shaft 96 and second arm 64 relative to first arm 62.

Referring again to FIGS. 3 and 4, third arm 66 comprises an attachment linkage 100 that is capable of joining third arm 66 with second arm 64 by means of engagement mechanism 102. Third arm 66 also comprises a rotatable member 104 that is rotatably attached to attachment linkage 100 by means of third drive mechanism 106. In addition, rotatable member 104 has the capability of having a television camera 108 attached thereto so as to be able to be directed toward the member to be inspected by probe positioner 50 and a probe holder 110 attached to the outermost end of rotatable member 104. Probe holder 110 may be a hollow plastic conduit capable of having a probe such as an eddy current probe or an ultrasonic probe disposed therein. Probe holder 110 is designed such that the particular probe disposed therein may extend through the probe holder conduit 112 to a probe pusher 114 as shown in FIG. 2. Probe positioner 50 is designed such that it is capable of positioning probe holder 110 in relationship to a particular tube 38 in tube sheet 28 so that the particular probe can be pushed by probe pusher 114 into and through the particular tube 38. In addition to this apparatus, a wide angle camera 116 may be disposed in the bottom of the inlet plenum as shown in FIG. 2 so as to be able to visually monitor the entire probe positioner 50.

Figure 6:
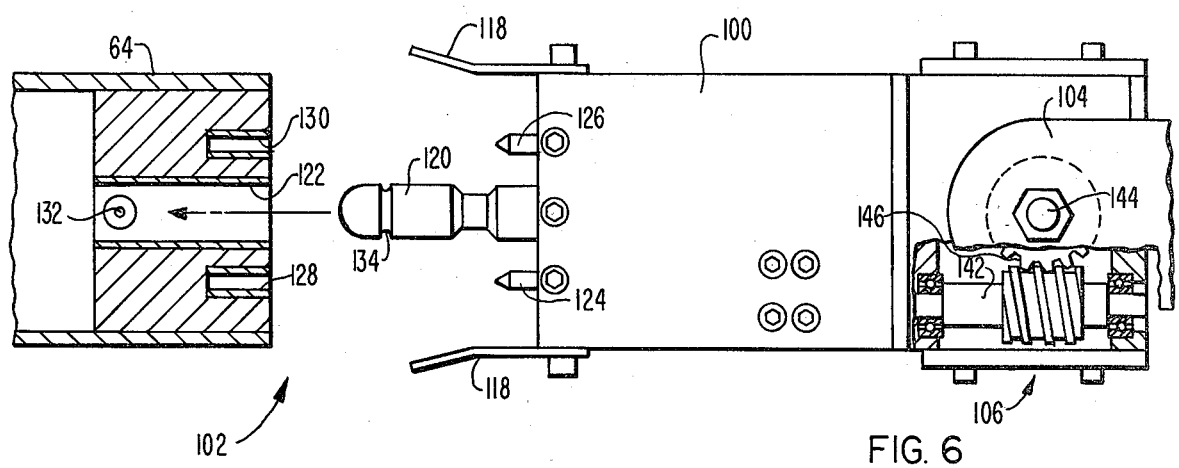
FIG. 6 is a partial cross-sectional top view of the arms of the probe positioner.
Figure 7:
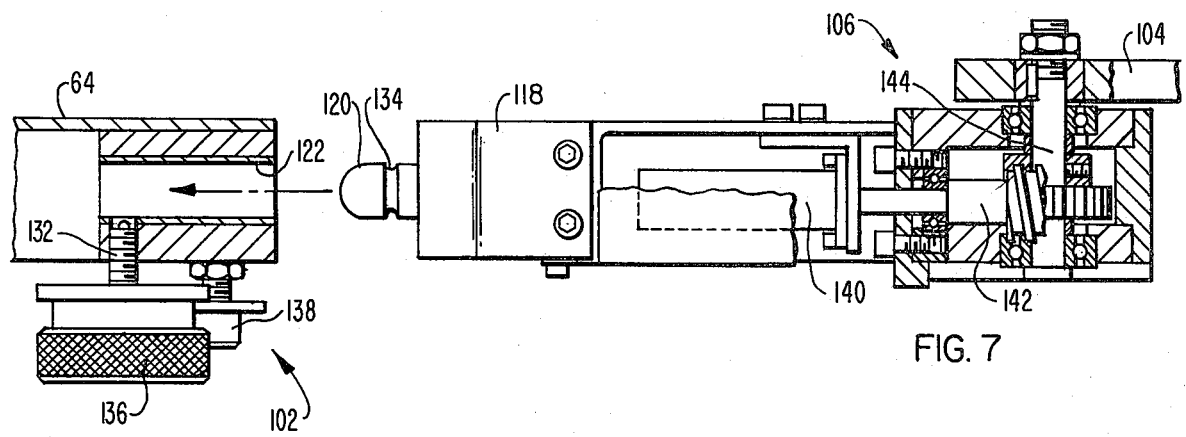
FIG. 7 is a cross-sectional view in elevation of an arm of the probe positioner.
Figure 8:
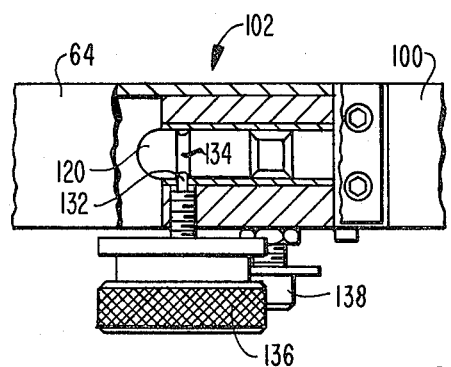
FIG. 8 is a cross-sectional view in elevation of the engagement mechanism.

Referring now to FIGS. 6, 7, and 8, engagement mechanism 102 comprises a set of clips 118 that are attached to the end of attachment linkage 100 so as to guide attachment linkage 100 into contact with second arm 64 and for restraining lateral movement of attachment linkage 100 with respect to second arm 64. Engagement mechanism 102 also comprises a first engagement pin 120 which is attached to attachment linkage 100 and is capable of being inserted into first pin guide 122. Engagement mechanism 102 also comprises a second engagement pin 124 and a third engagement pin 126 which are smaller than first engagement pin 120 and serve to align attachment linkage 100 with second arm 64 by being inserted into second pin guide 128 and third pin guide 130 respectively. Once first arm 62 and second arm 64 have been attached to first sleeve 68 as previously described, attachment linkage 100 may be manually engaged with second arm 64 by means of clips 118 and engagement pins 120, 124, and 126. Engagement mechanism 102 also comprises a locking pin 132 which is threaded into the bottom of second arm 64 and is capable of being extended into first pin guide 122. First engagement pin 120 has a first groove 134 therein that corresponds to the location of locking pin 132 when first engagement pin 120 is fully disposed in first pin guide 122. With first engagement pin 120 fully disposed in first pin guide 122, locking pin 132 may be advanced by manually turning knob 136 which causes locking pin 132 to be inserted into first groove 134 thus locking first engagement pin 120 in first pin guide 122. A lock nut 138 is also provided on second arm 64 for locking knob 136 in its locked position. Therefore, engagement mechanism 102 provides a mechanism by which third arm 66 may be attached to and locked into second arm 64 while second arm 64 is disposed in the steam generator 20.

Referring again to FIGS. 6, 7, and 8, third drive mechanism 106 comprises a suitably chosen electric motor 140 disposed in attachment linkage 100, a worm gear 142 attached to electric motor 140, a second shaft 142 vertically disposed within attachment linkage 100 and having a gear 146 attached thereto and in engagement with worm gear 142. Rotatable member 104 is firmly attached to the top of second shaft 144 so that when second shaft 144 is rotated about its vertical axis by means of worm gear 142 and electric motor 140, rotatable member 104 may be rotated in a horizontal plane as shown in FIG. 4. The combined rotations of first arm 62, second arm 64, and third arm 66 provide a mechanism by which probe holder 110 with a suitable probe disposed therein may be positioned in colinear alignment with a chosen tube 38 of tube sheet 28. With probe holder 110 so aligned with the particular tube 38, probe pusher 114 is capable of introducing the probe into the tube 38 for inspecting that tube.

Figure 10:
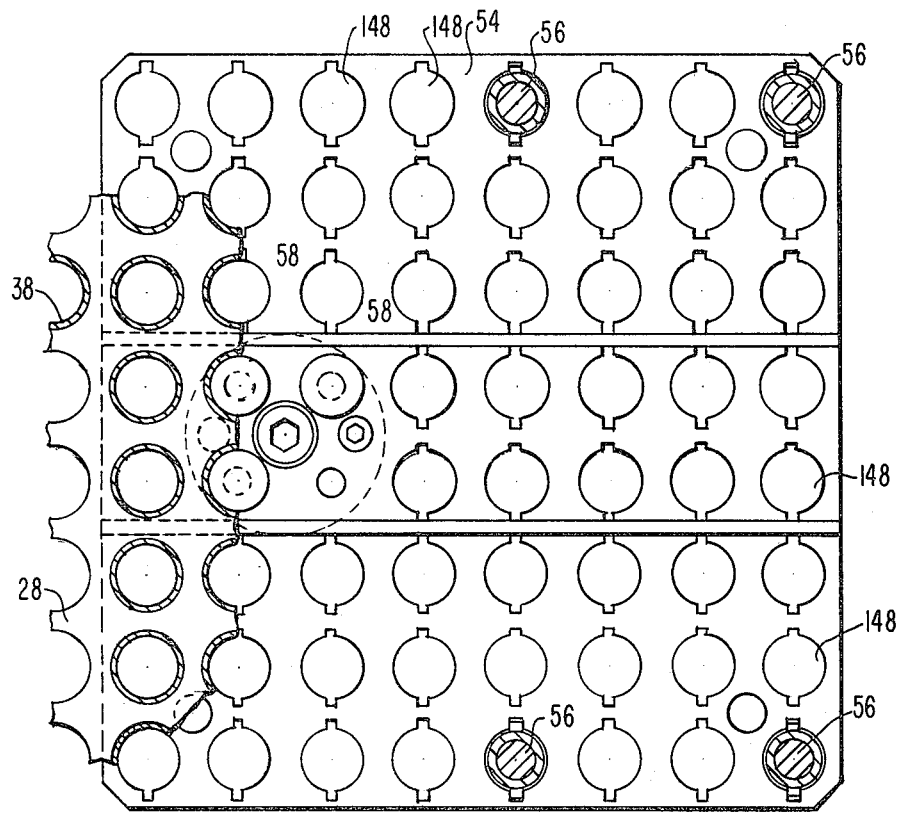
FIG. 10 is a cut-away top view of the tube sheet and support plate.
Figure 9:
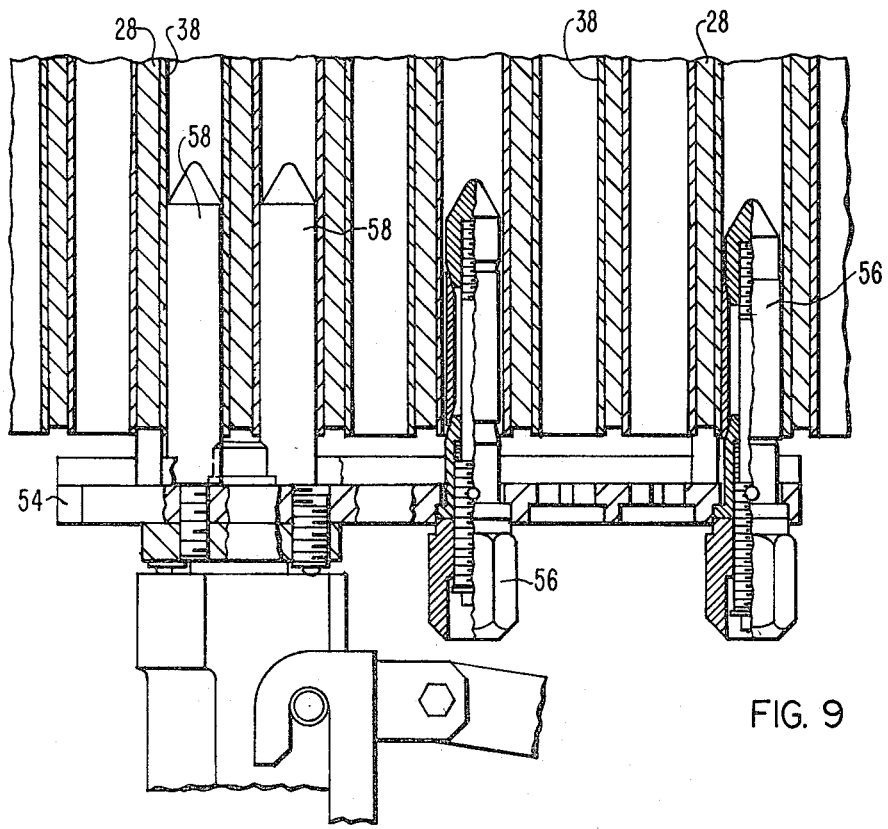
FIG. 9 is a cross-sectional view in elevation of the tube sheet with support plate attached thereto.

Referring now to FIGS. 9 and 10, support plate 54 has a plurality of holes 148 therein that correspond to tubes 38 of tube sheet 28. Camlocks 56 and guide pins 58 are designed such that they may be moved to various holes 148 so as to avoid any tubes 38 that may be plugged or otherwise nonaccessible. Holes 148 also allow probe holder 110 to be positioned below support plate 54 so that the probe may be inserted through holes 148 and into tubes 38. Therefore, by providing support plate 54 with a plurality of holes 148, the only tubes 38 that are blocked by the probe positioner 50 are those tubes 38 wherein guide pins 58 or camlocks 56 have been inserted. Of course, since guide pins 58 and camlocks 56 are capable of being moved to different holes 148 in support plate 54, all of the tubes 38 located immediately above support plate 54 may be probed by the probe and probe positioner 50.

Figure 11:
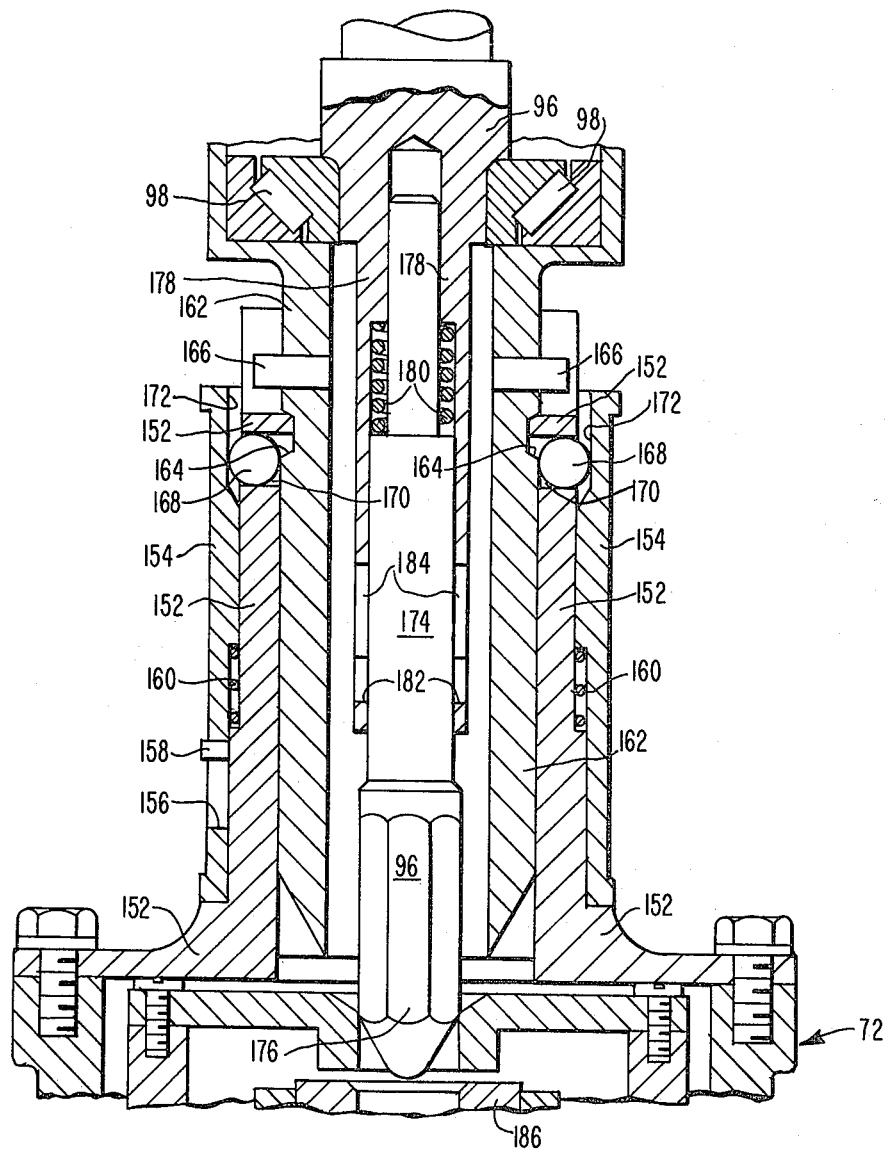
FIGS. 11 and 12 are cross-sectional views in elevation of the connection mechanism.
Figure 12:
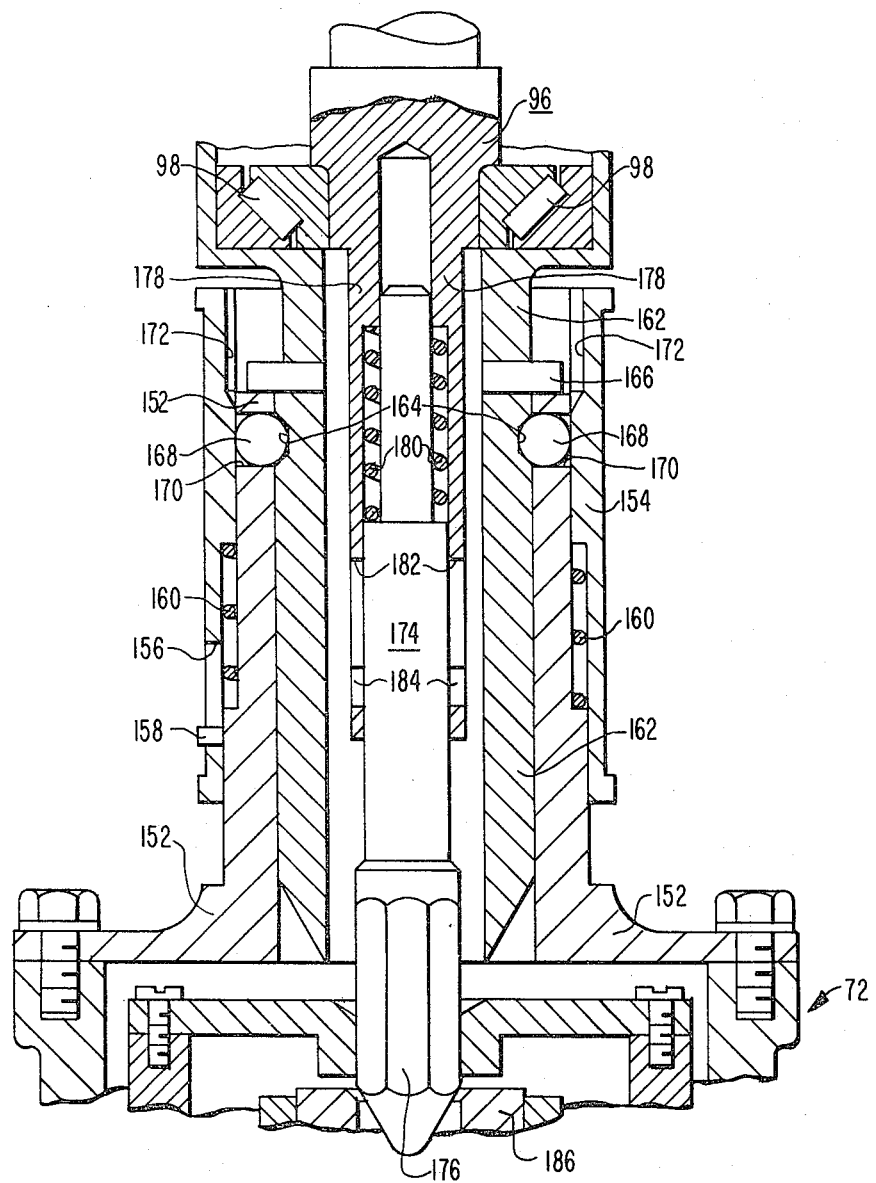

Referring now to FIGS. 5, 11, and 12, both first drive mechanism 70 and second drive mechanism 72 are similar devices and are equipped with quick disconnect mechanisms so that once first arm 62 and second arm 64 have been attached to first sleeve 68, first drive mechanism 70 may be quickly connected to the bottom end of first sleeve 68 and second drive mechanism 72 may be quickly connected to first shaft 96 by means of connection mechanisms 150. It should be understood that the bottom end of first sleeve 68 is identical to the bottom end of first shaft 96 as shown in FIGS. 11 and 12. Connection mechanism 150 comprises an inner sleeve 152 that is attached to the housing of a typical drive mechanism such as second drive mechanism 72. Connection mechanism 150 also comprises an outer sleeve 154 having a vertical slot 156 therein and is capable of sliding vertically along the outside of inner sleeve 152. An attachment pin 158 is attached to inner sleeve 152 and extends through vertical slot 156 so as to hold outer sleeve 154 on inner sleeve 152 while allowing outer sleeve 154 to slide vertically relative to inner sleeve 152. A first biasing mechanism 160 which may be a coil spring is disposed between inner sleeve 152 and outer sleeve 154 so as to urge outer sleeve 154 upwardly with respect to inner sleeve 152. Both first sleeve 68 and first arm 62 have a guide structure 162 that has a second groove 164 that extends around its outer perimeter and a set of stops 166 mounted slightly above second groove 164 as shown in FIGS. 5, 11, and 12. Guide structure 162 surrounds first shaft 96 but allows first shaft 96 to rotate within guide structure 162 by means of bearings 98. Connection mechanism 150 also comprises a series of metal balls 168 which are located in a circumferential slot 170 of inner sleeve 152. When it is desired to connect the drive mechanisms such as second drive mechanism 72 to first shaft 96 as indicated in FIG. 5, second drive mechanism 72 is held manually while outer sleeve 154 is manually retracted into a position as shown in FIG. 11. With outer sleeve 154 manually retracted, a third groove 172 in outer sleeve 154 corresponds to the location of metal balls 168 so that metal balls 168 are given a clearance that allows metal balls 168 to roll outwardly as second drive mechanism 72 is guided over guided structure 162 and as shown in FIG. 11. Second drive mechanism 72 is moved upwardly with respect to guide structure 162 until the uppermost portion of inner sleeve 152 contacts stops 166. When inner sleeve 152 has contacted stops 166, outer sleeve 154 is released which allows first biasing mechanism 160 to move outer sleeve 154 upwardly relative to inner sleeve 152 as shown in FIG. 12. When in this position, metal balls 168 are in a position that corresponds with second groove 164 so that as outer sleeve 154 is moved upwardly and third groove 172 is moved to a location higher than the location of metal balls 168, metal balls 168 are forced inwardly and into second grooves 164 thereby firmly connecting the drive mechanism and guide structure 162 as shown in FIG. 12.

Still referring to FIGS. 5, 11, and 12, first shaft 96 has a retractable lower portion 174 that has a hexagonally-shaped head 176 attached to the lower end thereof. Lower portion 174 is slideably disposed in an upper portion 178 that together comprise first shaft 96. A second biasing mechanism 180 which may be a coil spring is disposed between lower portion 174 and upper portion 178 so as to urge lower portion 174 downwardly with respect to upper portion 178. Upper portion 178 also has vertical openings 182 therein that allow extensions 184 that are attached to lower portion 174 to slide within vertical openings 182. Since extensions 184 are firmly attached to and may be an integral portion of lower portion 174, extensions 184 allow lower portion 174 to move vertically with respect to upper portion 178 but necessitates the rotation of upper portion 178 when lower portion 174 is rotated under the influence of second drive mechanism 72. Second drive mechanism 72 and first drive mechanism 70 have a contact member 186 that has a hexagonally-shaped opening therein. The hexagonally-shaped opening of contact member 186 is such that it conforms to hexagonally-shaped head 176 of first shaft 96. When the drive mechanism is being connected to guide structure 162 as previously described, hexagonally-shaped head 176 may not be aligned with the hexagonally-shaped opening of contact member 186. In this case, hexagonally-shaped head 176 is caused to be moved vertically which causes lower portion 174 to move vertically also, thus compressing second biasing mechanism 180 as shown in FIG. 11. When the drive mechanism is then activated which causes the hexagonally-shaped opening of contact member 186 to be rotated about the vertical axis of first shaft 96, second biasing mechanism 180 urges hexagonally-shaped head 176 toward the hexagonally-shaped opening of contact member 186 such that when the hexagonally-shaped opening of contact member 186 becomes aligned with hexagonally-shaped head 176, hexagonally-shaped head 176 will be forced into contact member 186 thus completing the connection between first shaft 96 and the drive mechanism. With first shaft 96 and the drive mechanism connected in this manner, the rotation of the drive mechanism causes first shaft 96 to also rotate which causes rotation of the particular arm in a horizontal plane.

Figure 13:
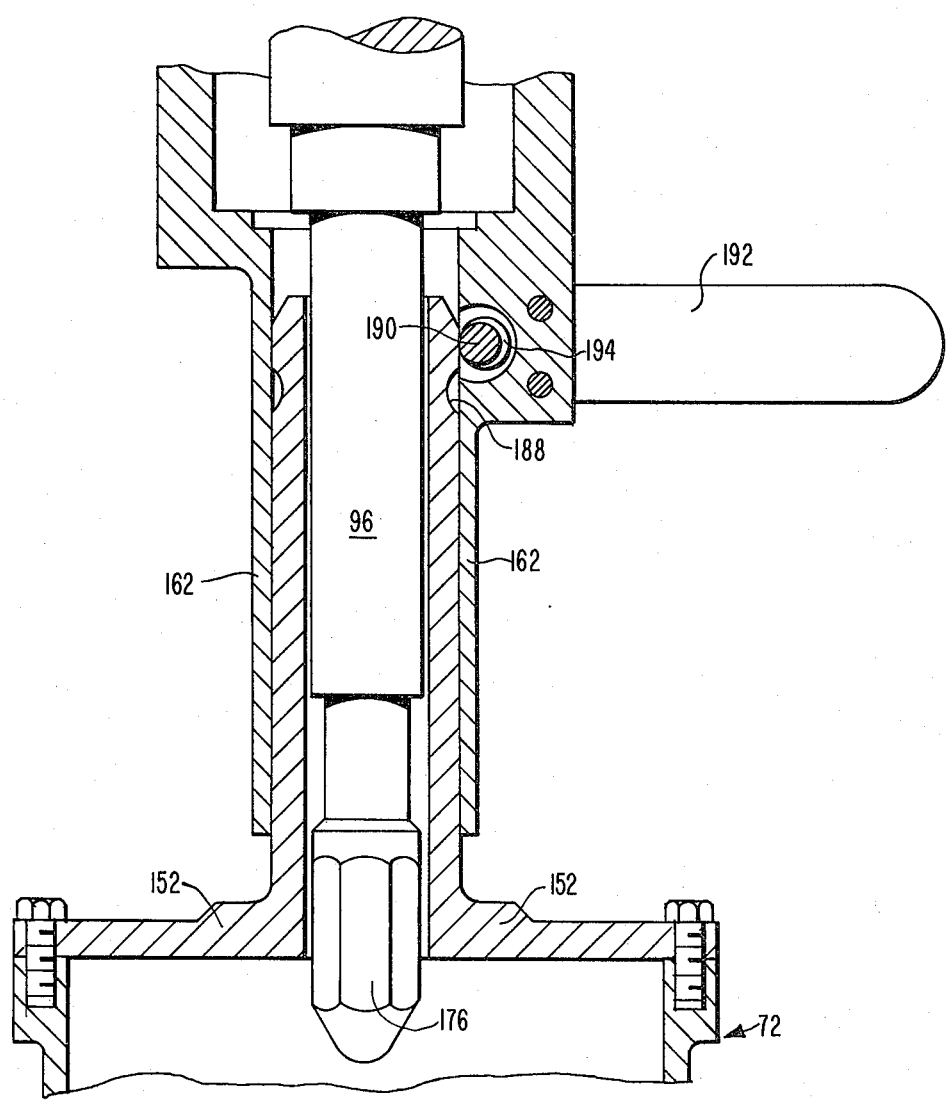
FIGS. 13 and 14 are cross-sectional views in elevation of an alternate connection mechanism.
Figure 14:
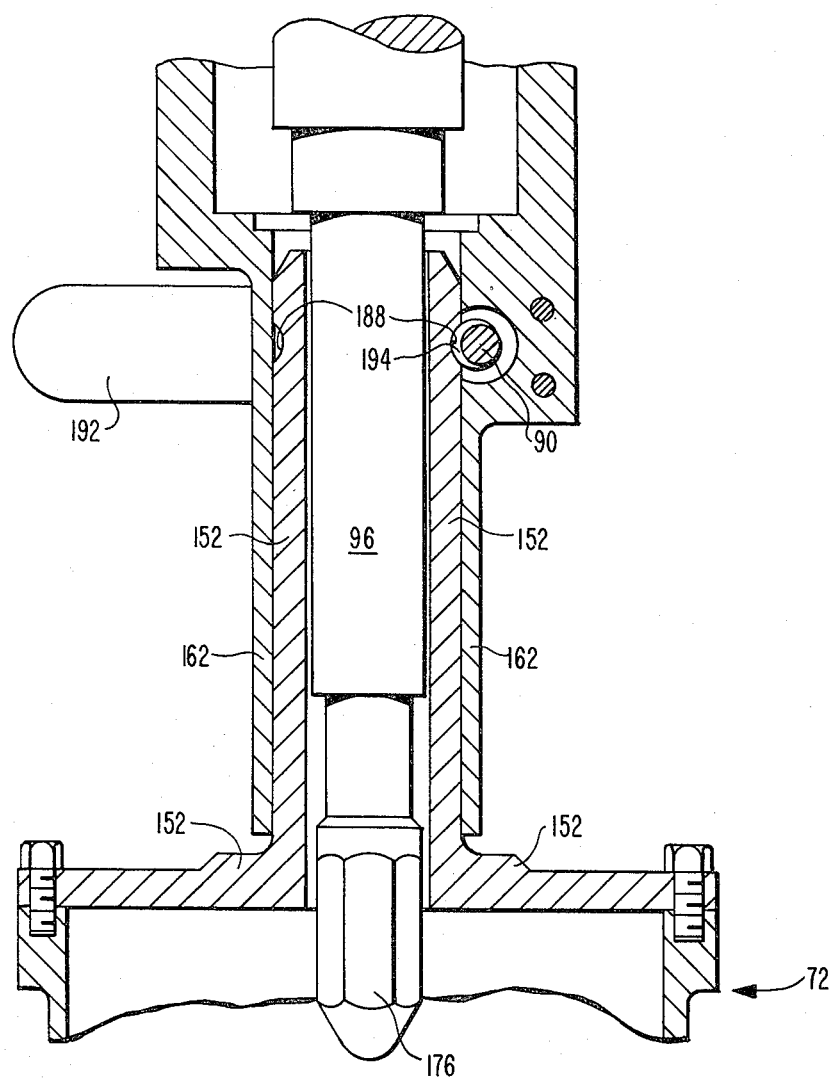

Referring now to FIGS. 13 and 14, as an aternative connection mechanism 150 may be such that inner sleeve 152 has a fourth groove 188 that extends around its circumference and wherein guide structure 162 is capable of fitting around the outside of inner sleeve 152. In this alternative embodiment, a rod 190 extends through guide structure 162 and has a handle 192 attached to its outer end. Rod 190 also has a eccentric portion 194 disposed thereon that has a curvature that corresponds to the curvature of fourth groove 188 such that when inner sleeve 152 is introduced into guide structure 162 so that fourth groove 188 corresponds to the location of rod 190 as shown in FIG. 14, handle 192 may be rotated so that eccentric portion 194 fits into fourth groove 188 as shown in FIG. 14. With eccentric portion 194 thus locked into fourth groove 188, second drive mechanism 72 is firmly attached to guide structure 162. Of course, in this alternative embodiment, first shaft 96 may be the same as that shown in FIGS. 11 and 12.

OPERATION

When it is desired to inspect tubes 38 of steam generator 20, personnel enter inlet plenum 34 and attach support plate 54 to tube sheet 28 by inserting guide pins 58 and camlocks 56 into tubes 38. With camlocks 56 and guide pins 58 thus inserted into tubes 38, camlocks 56 are manually activated so as to contact the inner surfaces of tubes 38 thus suspending support plate 54 from tube sheet 28 as shown in FIG. 2. With support plate 54 firmly suspended from tube sheet 28, first arm 62 with second arm 64 attached thereto is connected to sleeve 68 as previously described. With first arm 62 and second arm 64 thus attached to sleeve 68, third arm 66 is connected to second arm 64 by means of engagement mechanism 102. At this point, a television camera 108 may also be attached to the third arm 66 and a particular probe may be inserted in probe holder 110 and attached to probe pusher 114 as illustrated in FIGS. 2 and 3. Next, first drive mechanism 70 may be manually attached to sleeve 68 and second drive mechanism 72 may be manually attached to first shaft 96 as previously described and as indicated in FIG. 5. When in this position, all of the apparatus located in the steam generator is then connected by way of electrical cables to control panel 52 so that operators may remotely control probe positioner 50 thereby. The operator may then activate first drive mechanism 70, second drive mechanism 72, or electric motor 140 thus rotating first arm 62, second arm 64, or third arm 66 relative to each other so as to position probe holder 110 with the probe disposed therein in colinear alignment with a chosen tube 38 of tube sheet 28. When in this desired location, probe pusher 114 may be activated so as to introduce the chosen probe into the chosen tube 38 for inspecting that tube. When the chosen tube has been so inspected, the probe may be withdrawn by means of probe pusher 114 and probe positioner 50 may be repositioned so that the probe is located at a different tube 38. In this manner, a multiplicity of tubes 38 of steam generator 20 may be so inspected. Therefore, it can be seen that the probe positioner provides a mechanism for remotely positioning a probe in colinear alignment with a tube 38 in a nuclear steam generator so that the tube may be inspected remotely.

We claim as our invention:

1. A probe positioner for positioning probes in steam generators comprising:

a support plate having a plurality of holes therein arranged to correspond to the tubes in a steam generator upon attachment of said support plate to said tubes thereby providing access to said tubes through said holes for probing said tubes;

removable guide pins and camlocks attached to said support plate and capable of being disposed in said tubes for completely suspending said suport plate from said tubes;

a central member attached to said support plate;

a first sleeve rotatably disposed around said central member;

a first arm attached to said sleeve;

a second arm rotatably attached to said first arm;

a third arm attached to said second arm and capable of rotating relative to said second arm with a probe holder attached to an end thereof;

a first drive mechanism removably attached to said first sleeve for rotating said first sleeve and said first arm in a horizontal plane;

a second drive mechanism removably attached to said first arm and to said second arm for rotating said second arm in a horizontal plane relative to said first arm; and a third drive mechanism disposed in said third arm for rotating a portion of said third arm with respect to said first and second arms, the rotation of said first, second, and third arms being capable of positioning said probe holder and probe in colinear alignment with said tubes thereby allowing said probe to be introduced into said tube while said probe positioner is completely supported from said tubes by said support plate and camlocks.

2. The probe positioner according to claim 1 wherein said first drive mechanism comprises:

a motor having a contact member and being disposed in a housing;

an inner sleeve attached to said housing;

an outer sleeve slidably disposed on said inner sleeve;

first biasing means disposed between said inner sleeve and said outer sleeve for urging said outer sleeve upwardly with respect to said inner sleeve; and a plurality of metal balls disposed in said inner sleeve for contacting a portion of said first sleeve when said outer sleeve is moved upwardly relative to said inner sleeve and for allowing said inner sleeve to slide over a portion of said first sleeve when said outer sleeve is moved downwardly with respect to said inner sleeve thereby providing a mechanism for attaching said housing to said first sleeve.

3. The probe positioner according to claim 2 wherein said probe positioner further comprises:

an upper portion attached to said first sleeve;

a lower portion slidably disposed in said upper portion and having a head on the lower end thereof for engaging said contact member of said motor; and second biasing means disposed between said upper portion and said lower portion for urging said lower portion downwardly thereby engaging said head with said contact member thus connecting said first sleeve to said first drive mechanism.

4. The probe positioner according to claim 1 wherein said second drive mechanism comprises:

a motor having a contact member and being disposed in a housing;

an inner sleeve attached to said housing;

an outer sleeve slidably disposed on said inner sleeve;

first biasing means disposed between said inner sleeve and said outer sleeve for urging said outer sleeve upwardly with respect to said inner sleeve; and a plurality of metal balls disposed in said inner sleeve for contacting a portion of said first arm when said outer sleeve is moved upwardly relative to said inner sleeve and for allowing said inner sleeve to slide over a portion of said first arm when said outer sleeve is moved downwardly with respect to said inner sleeve thereby providing a mechanism for attaching said housing to said first arm.

5. The probe positioner according to claim 4 wherein said probe positioner further comprises:

an upper portion attached to said second arm and rotatably disposed in said first arm;

a lower portion slidably disposed in said upper portion and having a head on the lower end thereof for engaging said contact member of said motor; and second biasing means disposed between said upper portion and said lower portion for urging said lower portion downwardly thereby engaging said head with said contact member thus connecting said second arm to said second drive mechanism.

6. The probe positioner according to claim 1 wherein said third arm comprises:

an attachment linkage with said third drive mechanism disposed therein;

an engagement mechanism partially attached to said attachment linkage for connecting said attachment linkage to said second arm;

a worm gear disposed in said attachment linkage and connected at one end to said third drive mechanism and at the other end to a vertical second shaft for rotating said second shaft under the influence of said third drive mechanism; and a rotatable member having said probe holder attached to the end thereof and being attached to said second shaft, said rotatable member being capable of positioning said probe holder with a probe disposed therein in colinear alignment with said tubes when rotated by said third drive mechanism.

7. The probe positioner according to claim 6 wherein said engagement mechanism comprises:

a first engagement pin attached to said attachment linkage and having a first groove therein and being capable of being disposed in a first pin guide in said second arm; and a locking pin threadingly engaged with said second arm and capable of being extended into said first groove when said first engagement pin is disposed in said first pin guide thereby locking said third arm to said second arm.

8. The probe positioner according to claim 7 wherein said first arm comprises:

a third pin slidably disposed in said first arm and capable of being disposed in a slot in said first sleeve thereby locking said first arm onto said first sleeve; and a lever pivotally mounted on said first arm and attached to said third pin for selectively engaging said third pin with said slot.

9. The probe positioner according to claim 1 wherein said probe positioner further comprises:

a rod having an eccentric portion thereon and being rotatably disposed in said first sleeve;

a handle attached to said rod; and an inner sleeve mounted on said first drive mechanism and being capable of being inserted into said first sleeve, said inner sleeve having a groove therein for accommodating said eccentric portion of said rod when said handle is rotated thereby locking said first drive mechanism onto said first sleeve.

10. The probe positioner according to claim 1 wherein said probe positioner further comprises:

a rod having an eccentric portion thereon and being rotatably disposed in a portion of said first arm;

a handle attached to said rod; and an inner sleeve mounted on said second drive mechanism and being capable of being inserted into said portion of said first arm, said inner sleeve having a groove therein for accommodating said eccentric portion of said rod when said handle is rotated thereby locking said second drive mechanism onto said first arm.

* * * * *